(12) United States Patent
Kobayashi et al.

(10) Patent No.: US 11,413,706 B2
(45) Date of Patent: Aug. 16, 2022

(54) METHOD FOR STACK-WELDING DISSIMILAR METAL MEMBERS

(71) Applicant: TOYOTA JIDOSHA KABUSHIKI KAISHA, Toyota (JP)

(72) Inventors: Hiroomi Kobayashi, Okazaki (JP); Yoshinori Shibata, Nagoya (JP); Hiroyuki Nakayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/594,442

(22) Filed: Oct. 7, 2019

(65) Prior Publication Data

US 2020/0130100 A1 Apr. 30, 2020

(30) Foreign Application Priority Data

Oct. 26, 2018 (JP) .............................. JP2018-201655

(51) Int. Cl.
*B23K 26/323* (2014.01)
*B23K 26/00* (2014.01)
*B23K 26/21* (2014.01)

(52) U.S. Cl.
CPC ............ *B23K 26/323* (2015.10); *B23K 26/21* (2015.10)

(58) Field of Classification Search
CPC .............................. B23K 26/21; B23K 26/323
USPC ........................................................ 219/118
See application file for complete search history.

(56) References Cited

U.S. PATENT DOCUMENTS

| 4,157,923 A * | 6/1979 | Yen | B23K 35/286 |
| | | | 148/512 |
| 4,725,708 A * | 2/1988 | Kawasaki | B23K 35/302 |
| | | | 219/121.64 |
| 2001/0013509 A1* | 8/2001 | Haschke | B23K 26/02 |
| | | | 219/121.64 |
| 2009/0223940 A1* | 9/2009 | Hosoya | B23K 15/0093 |
| | | | 219/121.64 |
| 2015/0283648 A1* | 10/2015 | Hisada | B23K 26/22 |
| | | | 403/272 |
| 2016/0052091 A1* | 2/2016 | Uchida | B23K 26/03 |
| | | | 219/121.64 |
| 2016/0114429 A1 | 4/2016 | Shioga et al. | |

(Continued)

FOREIGN PATENT DOCUMENTS

| JP | 2001-047244 A | 2/2001 |
| JP | 2004-042053 A | 2/2004 |

(Continued)

*Primary Examiner* — Helena Kosanovic
*Assistant Examiner* — Lawrence H Samuels
(74) *Attorney, Agent, or Firm* — Oblon, McClelland, Maier & Neustadt, L.L.P.

(57) ABSTRACT

A method for stack-welding dissimilar metal members by placing a first metal member and a second metal member having a melting point higher than that of the first metal member on top of one another and performing laser welding is provided. The second metal member is placed on the first metal member, and a molten pool in which only the second metal member is melted is formed by applying a laser beam for thermal-conduction welding from above the second metal member. After the molten pool comes into contact with the first metal member and hence the first metal member melts in the molten pool, the molten pool solidifies, so that the first and second metal members and are welded together.

3 Claims, 6 Drawing Sheets

(56) References Cited

U.S. PATENT DOCUMENTS

| | | | |
|---|---|---|---|
| 2018/0026252 A1 | 1/2018 | Kumazawa et al. | |
| 2018/0029163 A1* | 2/2018 | Capostagno | B23K 26/082 |
| 2018/0245616 A1* | 8/2018 | Kumazawa | F16B 5/08 |
| 2019/0126402 A1* | 5/2019 | Yang | B23K 26/0006 |
| 2019/0329361 A1* | 10/2019 | Nakada | B23K 26/28 |

FOREIGN PATENT DOCUMENTS

| | | |
|---|---|---|
| JP | 5982652 B2 | 8/2016 |
| JP | 2018-12125 A | 1/2018 |

* cited by examiner

METHOD FOR STACK-WELDING DISSIMILAR METAL MEMBERS

CROSS REFERENCE TO RELATED APPLICATIONS

This application is based upon and claims the benefit of priority from Japanese patent application No. 2018-201655, filed on Oct. 26, 2018, the disclosure of which is incorporated herein in its entirety by reference.

BACKGROUND

The present disclosure relates to a method for stack-welding dissimilar metal members, and in particular, to a method for stack-welding dissimilar metal members by irradiating them with a laser beam.

For example, when a secondary battery, a capacitor (a condenser), or the like is manufactured, in some cases, welding is performed in order to electrically connect terminals and electrodes, etc. made of aluminum or an alloy thereof with terminals and electrodes, etc. made of copper or an alloy thereof. When such dissimilar metal members are welded together, an intermetallic compound (IMC: Inter-Metallic Compound), which is hard and brittle, is formed in the welded part, thus raising a possibility that cracking could occur.

Japanese Unexamined Patent Application Publication No. 2018-012125 discloses a method for stack-welding dissimilar metal members by placing an aluminum plate on a copper plate and applying a laser beam from above the aluminum plate to them. In Japanese Unexamined Patent Application Publication No. 2018-012125, the strength of the welded part is ensured by adjusting the ratio of the intermetallic compound therein to a range of 15 to 60%.

SUMMARY

The present inventors have found the following problem regarding the method for stack-welding dissimilar metal members. As described above, in the welding method disclosed in Japanese Unexamined Patent Application Publication No. 2018-012125, a laser beam is applied from above the aluminum plate having a low melting point placed on the copper plate having a high melting point. Therefore, it is necessary to perform a key-hole welding so as to weld the copper plate by the laser beam which has passed through the aluminum plate.

In such key-hole welding, to begin with, it is difficult to control the ratio of the intermetallic compound to the aforementioned range because a molten pool in which aluminum and copper are melted is stirred. In addition, there is a problem that since the generation of the intermetallic compound is accelerated due to the stirring of the molten pool, the intermetallic compound reaches the surface of the molten pool and hence cracking tends to occur in the welded part at the early stage. Note that this early-stage cracking in the welded part has adverse effects on the welded part, such as deteriorations in the strength and the conductivity of the welded part.

The present disclosure has been made in view of the above-described circumstance and provides a method for stack-welding dissimilar metal members, capable of preventing a molten pool from being stirred and thereby preventing early-stage cracking from occurring in the welded part due to an intermetallic compound.

A first exemplary aspect is a method for stack-welding dissimilar metal members by placing a first metal member and a second metal member having a melting point higher than that of the first metal member on top of one another and performing laser welding, including placing the second metal member on the first metal member, and forming a molten pool in which only the second metal member is melted by applying a laser beam for thermal-conduction welding from above the second metal member, in which after the molten pool comes into contact with the first metal member and hence the first metal member melts in the molten pool, the molten pool solidifies, so that the first and second metal members are welded together.

In the method for stack-welding dissimilar metal members according to an aspect of the present disclosure, the second metal member having a melting point higher than that of the first metal member is placed on the first metal member and a molten pool in which only the second metal member is melted is formed by applying a laser beam for thermal-conduction welding from above the second metal member. Then, after this molten pool comes into contact with the first metal member and hence the first metal member melts in the molten pool, the molten pool solidifies, so that the first and second metal members are welded together.

By the above-described configuration, it is possible to prevent the molten pool from being stirred after both the first and second metal members are melted and thereby to prevent an intermetallic compound from being generated and growing. As a result, it is possible to prevent early-stage cracking from occurring in the welded part due to the intermetallic compound.

When the second metal member is placed on the first metal member prior to the irradiation with the laser beam, a gap may be formed between the first and second metal members in a place where the laser beam is applied.

By the above-described configuration, the molten pool becomes less likely to come into contact with the first metal member when the laser beam is being applied. Therefore, it is possible to further prevent the molten pool from being stirred after both the first and second metal members are melted in the molten pool.

The first metal member may be made of a metallic material containing aluminum as a main component and the second metal member may be made of a metallic material containing copper as a main component. The present disclosure is suitable for such a structure.

The laser beam may be applied under a condition in which for irradiation energy [J] of the laser beam, a time [ms] from the end of the irradiation with the laser beam to the completion of the solidification of the molten pool is 0.2 [ms/J] or shorter.

By the above-described configuration, it is possible to prevent the molten pool from being stirred after both the first and second metal members are melted in the molten pool more reliably and thereby to prevent early-stage cracking from occurring in the welded part due to the intermetallic compound.

According to the present disclosure, it is possible to provide a method for stack-welding dissimilar metal members, capable of preventing a molten pool from being stirred and thereby preventing early-stage cracking from occurring in the welded part due to an intermetallic compound.

The above and other objects, features and advantages of the present disclosure will become more fully understood from the detailed description given hereinbelow and the

DESCRIPTION OF EMBODIMENTS

Specific embodiments to which the present disclosure is applied will be described hereinafter in detail with reference to the drawings. However, the present disclosure is not limited to the below-shown embodiments. Further, the following descriptions and drawings are simplified as appropriate for clarifying the explanation.

First Embodiment

<Structure of Welded Metal Foil Lamination>

Firstly, a stack-welded joint welded by using a method for stack-welding dissimilar metal members according to a first embodiment is described with reference to FIGS. 1 and 5.

Figure 1:
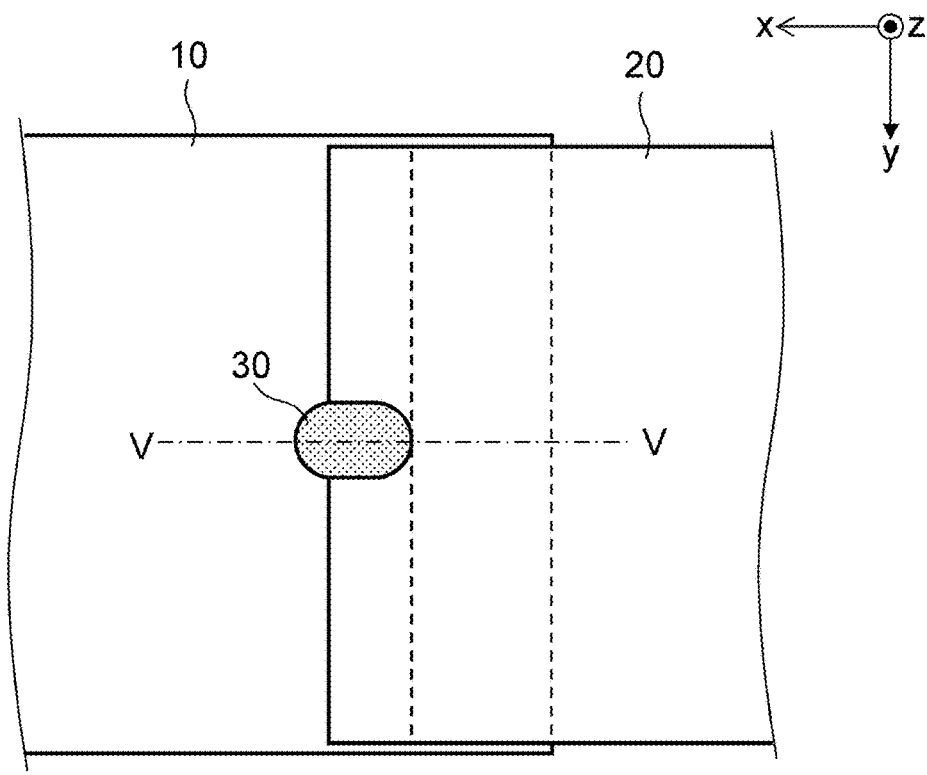
FIG. 1 is a plan view of a stack-welded joint welded by using a method for stack-welding dissimilar metal members according to a first embodiment.

FIG. 1 is a plan view of a stack-welded joint welded by using a method for stack-welding dissimilar metal members according to the first embodiment. FIG. 5 is a cross section showing the method for stack-welding dissimilar metal members according to the first embodiment taken along a line V-V in FIG. 1. As shown in FIGS. 1 and 5, the stack-welded joint is formed of metal members 10 and 20 welded in a welded part 30.

Note that, needless to say, a right-handed xyz-orthogonal coordinate system shown in FIG. 1 and other figures is for the sake of explaining a positional relation among components. As a general rule, the z-axis positive direction is a vertically upward direction and the xy-plane is a horizontal plane. Further, they apply throughout the drawings.

The metal members 10 and 20 are made of different metallic materials having different melting points. Further, the metal member 20 is made of a metallic material having a melting point higher than that of the metallic material for the metal member 10. The metal members 10 and 20 are, for example, members such as terminals and electrodes used in a secondary battery, a capacitor (a condenser), etc. The metal member 10 is made of a metallic material that contains, for example, aluminum as its main component and has a high electrical conductivity. The metal member 20 is made of a metallic material that contains, for example, copper as its main component and has a high electrical conductivity.

Note that although each of the metal members 10 and 20 shown in FIG. 1 is a simple metal plate having a rectangular shape in a plan view and extending in the x-axis direction, their shapes are not limited to any shapes as long as they can be stack-welded. For example, the metal member 20 may have a circular shape in a plan view.

Figure 5:
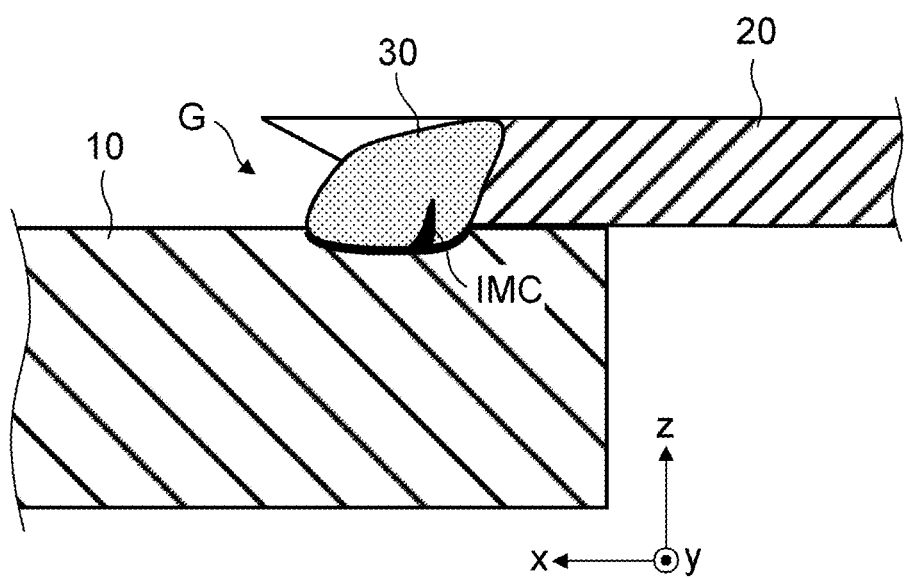
FIG. 5 is a cross section showing a method for stack-welding dissimilar metal members according to the first embodiment.

In the examples shown in FIGS. 1 and 5, an end part on the x-axis positive direction side of the metal member 20 having a high melting point is placed on an end part on the x-axis negative direction side of the metal member 10. As will be described later in detail, in the welding method according to this embodiment, a molten pool in which only the metal member 20 is melted is formed by applying a laser beam for thermal-conduction welding from above the metal member 20 having the high melting point. As this molten pool comes into contact with the metal member 10 having the low melting point, the metal member 10 melts, so that the metal members 10 and 20 are welded together. Further, as the molten pool solidifies, the welded part 30 is formed.

As shown in FIG. 5, an intermetallic compound IMC is formed near the interface between the welded part 30 and the metal member 10. As described above, in the welding method according to this embodiment, as the molten pool having a temperature higher than the melting point of the metal member 20 comes into contact with the metal member 10 having the low melting point, the metal member 10 melts. That is, since the molten pool is prevented from being stirred after both the metal members 10 and 20 are melted, the intermetallic compound IMC are also prevented from being generated and growing. Therefore, in the stack-welded joint welded by using the method for stack-welding dissimilar metal members according to this embodiment, the intermetallic compound IMC is contained inside the welded part 30. It has been found that as a result, an amount of the intermetallic compound IMC exposed to the outer surface is reduced and hence early-stage cracking in the welded part 30 is prevented.

In the example shown in FIGS. 1 and 5, the welded part 30 is formed on the outer edge on the x-axis positive direction side of the metal member 20. Note that as shown in FIG. 5, the outer edge on the x-axis positive direction side of the metal member 20 is inclined so that the top surface of the metal member 20 protrudes further than the bottom surface thereof. Therefore, on the outer edge on the x-axis positive direction side of the metal member 20, a gap G is formed between the surfaces of the metal members 10 and 20 that face each other (i.e., are in contact with each other). In the example shown in FIGS. 1 and 5, the molten pool in which only the metal member 20 is melted is formed above this gap G. Further, this molten pool eventually comes into contact with the metal member 10. Therefore, the welded part 30 is formed so that it fills the gap G between the metal members 10 and 20. Note that the gap G is not essential.

The shape of the welded part 30 in a plan view is not limited to any particular shapes. In the example shown in FIG. 1, the welded part 30 has an oval shape extending in the x-axis direction. For example, a welded part 30 having such a shape can be formed by scanning a laser beam (i.e., moving its irradiation point on the welded part 30) once in the x-axis positive direction.

Note that a plurality of welded parts 30 may be arranged along the y-axis direction on the outer edge on the x-axis positive direction side of the metal member 20.

<Method for Stack-Welding Dissimilar Metal Members>

Next, a method for stack-welding dissimilar metal members according to this embodiment is described with reference to FIGS. 2 to 5. FIGS. 2 to 5 are cross sections showing a method for stack-welding dissimilar metal members according to the first embodiment. The method for stack-welding dissimilar metal members according to this embodiment is a method for stack-welding dissimilar metal members by placing dissimilar metal members having different melting points on top of one another and laser-welding them.

Figure 2:
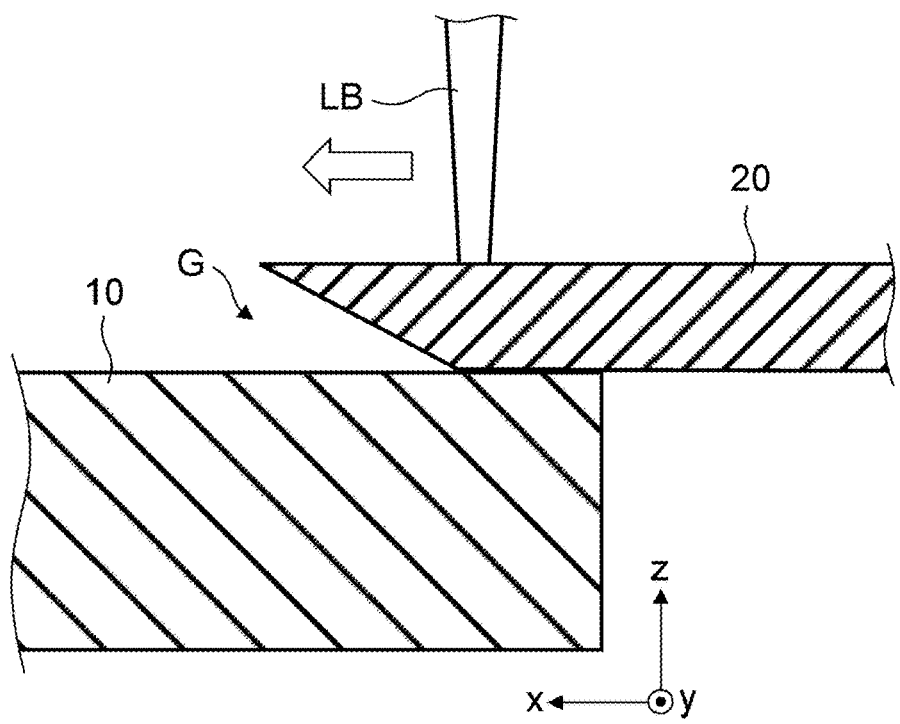
FIG. 2 is a cross section showing a method for stack-welding dissimilar metal members according to the first embodiment.

Firstly, as shown in FIG. 2, before applying a laser beam LB, a metal member 20 (a second metal member) having a melting point higher than that of a metal member 10 (a first metal member) is placed on the metal member 10. In the example shown in FIG. 2, an end part on the x-axis positive direction side of the metal member 20 having a melting point higher than that of the metal member 10 is placed on an end part on the x-axis negative direction side of the metal member 10. Then, the laser beam LB for thermal-conduction welding is applied from above the metal member 20. In this process, for example, the laser beam LB is scanned (i.e., its irradiation point on the metal member 20 is moved) in the x-axis positive direction from the inner side (the x-axis negative direction side) of the metal member 20 toward the outer edge on the x-axis positive direction side thereof.

As described above, the metal member 10 is made of a metallic material that contains, for example, aluminum as its main component and has a high electrical conductivity (e.g., aluminum and its alloy). The metal member 20 is made of a metallic material that contains, for example, copper as its main component and has a high electrical conductivity (e.g., copper and its alloy).

A difference between the melting points of the metal members 10 and 20 is, for example, 300° C. or larger. Note that the melting point of pure copper is 1084° C. and that of pure aluminum is 660° C.

Further, in the example shown in FIG. 2, when the metal member 20 is placed on the metal member 10, a gap G is formed between the metal members 10 and 20 in a place to which the laser beam LB is applied. Specifically, as shown in FIG. 2, the outer edge on the x-axis positive direction side of the metal member 20 is inclined so that the top surface of the metal member 20, to which the laser beam LB is applied, protrudes further than the bottom surface thereof, which is in contact with the metal member 10. Therefore, on the outer edge on the x-axis positive side of the metal member 20, a wedge-shaped gap G is formed between the surfaces of the metal members 10 and 20 that face each other (i.e., are in contact with each other).

Note that the shape of the gap G is not limited to any particular shapes. For example, one or a plurality of steps may be formed on the end surface on x-axis positive direction side of the metal member 20 so that the top surface of the metal member 20 protrudes further than the bottom surface thereof. Further, the gap G is not essential.

Figure 3:
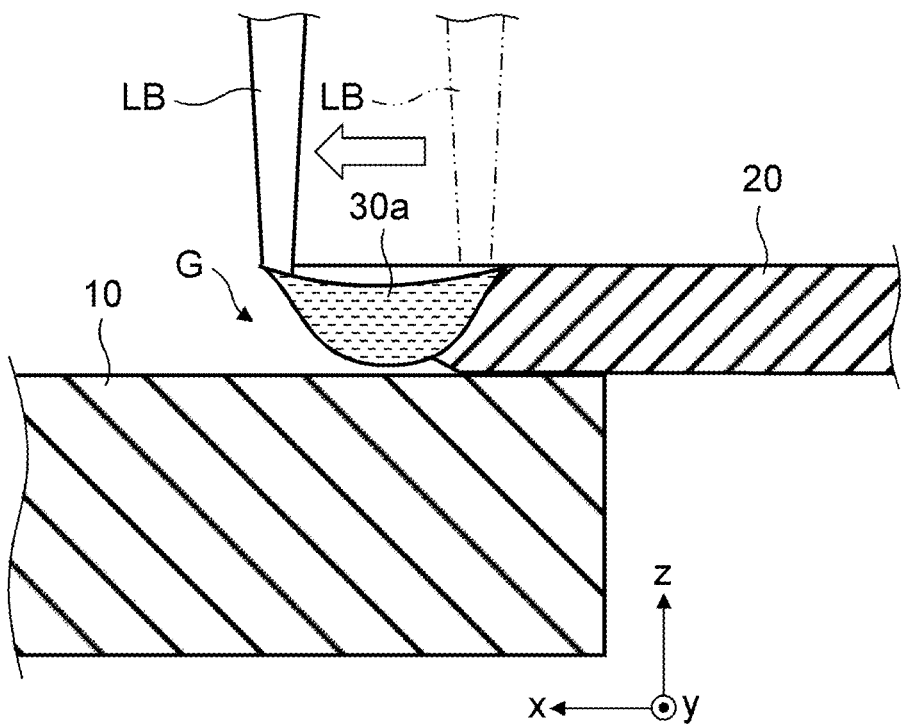
FIG. 3 is a cross section showing a method for stack-welding dissimilar metal members according to the first embodiment.

Next, as shown in FIG. 3, since the laser beam LB for thermal-conduction welding does not reach the metal member 10, it is possible to form a molten pool 30a in which only the metal member 20 having a high melting point is melted. Further, the circumference of the molten pool 30a is entirely surrounded by the metal member 20 when the laser beam LB is being applied. Therefore, the molten pool 30a is held in the metal member 20 by the surface tension and hence is unlikely to come into contact with the metal member 10.

Further, owing to the gap G between the metal members 10 and 20, the molten pool 30a is unlikely to come into contact with the metal member 10.

Note that the laser beam LB for thermal-conduction welding means a laser beam LB that has a relatively low energy density, i.e., an energy density that is sufficiently low so that no key hole is formed. The energy density of the laser beam LB can be adjusted by changing conditions such as the power output, the scanning speed, the spot diameter, etc. of the laser beam LB.

Figure 4:
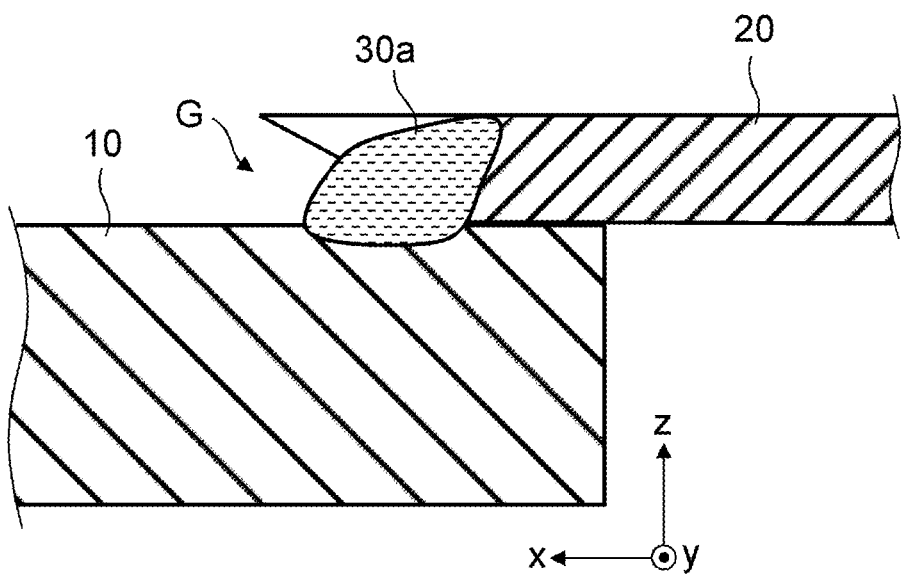
FIG. 4 is a cross section showing a method for stack-welding dissimilar metal members according to the first embodiment.

Next, as shown in FIG. 4, when the laser beam LB reaches the outer edge on the x-axis positive direction side of the metal member 20, the scanning and the irradiation by the laser beam LB are terminated. That is, the laser beam LB is not directly applied to the metal member 10 any longer. Note that since the molten pool 30a also reaches the outer edge on the x-axis positive direction side of the metal member 20, the outer edge on the x-axis positive direction side of the molten pool 30a is no longer surrounded by the metal member 20. Further, the molten pool 30a grows as the scanning by the laser beam LB proceeds. Therefore, as shown in FIG. 4, the molten pool 30a eventually comes into contact with the metal member 10. When the molten pool 30a having a temperature higher than the melting point of the metal member 20 comes into contact with the metal member 10 having the low melting point, the metal member 10 melts.

Then, as shown in FIG. 5, as the molten pool 30a solidifies, a welded part 30 is formed and hence the metal members 10 and 20 are welded together.

For example, when a molten pool 30a made of copper comes into contact with a metal member 10 made of aluminum, the metal member 10 melts in the molten pool 30a. After that, the molten pool 30a solidifies and hence a welded part 30 is formed.

In this example, an intermetallic compound IMC composed of copper and aluminum is formed near the interface between the welded part 30 and the metal member 10. Well-known examples of the intermetallic compound IMC composed of copper and aluminum include $Cu_9Al_4$, $CuAl$ and $CuAl_2$, all of which are hard and brittle. Therefore, when the ratio of the intermetallic compound IMC increases, early-stage cracking tends to occur in the welded part 30.

As described above, in the welding method according to this embodiment, a molten pool 30a in which only the metal member 20 is melted is formed by applying a laser beam LB for thermal-conduction welding from above the metal member 20 having a higher melting point. Then, as the molten pool 30a having a temperature higher than the melting point of the metal member 20 comes into contact with the metal member 10 having the lower melting point, the metal member 10 melts in the molten pool 30a. After that, as the molten pool 30a solidifies, the metal members 10 and 20 are welded together.

Therefore, the molten pool 30a is prevented from being stirred after both the metal members 10 and 20 are melted. Therefore, compared to the key-hole welding, it is possible to prevent the intermetallic compound IMC from being generated and growing. Therefore, it is possible to prevent early-stage cracking from occurring in the welded part 30 due to the intermetallic compound IMC. As a result, it is possible to improve the strength and the electrical conductivity of the welded part 30.

Further, in the welding method according to this embodiment, as shown in FIG. 2, when the metal member 20 is placed on the metal member 10, the gap G is formed between the metal members 10 and 20 in the place to which the laser beam LB is applied. As shown in FIG. 3, owing to the gap G, the molten pool 30a is unlikely to come into contact with the metal member 10 when the laser beam LB is being applied. Therefore, the molten pool 30a is further prevented from being stirred after both the metal members 10 and 20 are melted. Therefore, it is possible to prevent the intermetallic compound IMC from being generated and growing more effectively.

Note that, for example, the maximum clearance in the gap G (i.e., the clearance of the largest part of the gap) is 0.05 mm or longer and the minimum clearance in the gap G (i.e., the clearance of the smallest part of the gap) is 0.5 mm or shorter. When the maximum clearance in the gap G is shorter than 0.05 mm, no substantial effect can be obtained by the gap G. On the other hand, when the maximum clearance in the gap G exceeds 0.5 mm, there is a possibility that the molten pool 30a does not come into contact with the metal member 10 even after the termination of the irradiation with the laser beam LB and hence the metal members 10 and 20 cannot be welded.

The method for stack-welding dissimilar metal members according to the first embodiment is described hereinafter in a more detailed manner by using some examples. However, the method for stack-welding dissimilar metal members according to the first embodiment is not limited to the examples shown below.

Example 1

<Test Condition>

Firstly, conditions for tests for a method for stack-welding dissimilar metal members according to an Example 1 are described. For each of samples 1 to 5, a copper plate having a thickness of 0.5 mm (JIS standards C1100) was placed on an aluminum plate having a thickness of 1.5 mm (JIS standards A1050). Then, they were welded together by applying a laser beam from above the copper plate under conditions shown below. Note that a gap G like the one shown in FIGS. 2 to 5 was formed.

Note that the samples 1 to 4 are examples and the sample 5 is a comparative example. Regarding the samples 1 to 5, area ratios of intermetallic compounds and presence/absence of early-stage cracking on cross sections of welded parts were examined while changing the power output, the scanning speed, the scanning distance (i.e., the irradiation energy) of the laser beam. Note that they were examined by observing microstructures on the cross sections of the welded parts. A beam diameter of the laser beam was 0.6 mm for all the samples. Further, for each sample, an area ratio of the intermetallic compound on a surface of the welded part was examined by macroscopically observing the surface. In the observation of the microstructure on the cross section and the macroscopic observation on the surface, the intermetallic compound can be identified based on the color.

Table 1 collectively shows the power output [kW], the scanning speed [mm/s], the scanning distance [mm], and the irradiation energy [J] in the method for stack-welding dissimilar metal members according to the samples 1 to 5. The irradiation energy E is the product of the power output P and the irradiation time t, and the irradiation time t is a value obtained by dividing the scanning distance L by the scanning speed v. That is, the irradiation energy E can be obtained from the following Expression (1).

$$E[J] = P[W] \times t[s] = P[W] \times L[mm]/v[mm/s] \quad (1)$$

TABLE 1

| | Power output [kW] | Scanning speed [mm/s] | Scanning distance [mm] | Irradiation energy [J] |
|---|---|---|---|---|
| Sample 1 | 3.6 | 110 | 0.8 | 26.2 |
| Sample 2 | 2.4 | 60 | 0.8 | 32.0 |
| Sample 3 | 2.8 | 60 | 0.8 | 37.3 |
| Sample 4 | 3.0 | 70 | 0.8 | 34.3 |
| Sample 5 | 2.5 | 30 | 0.5 | 41.7 |

<Test Result>

Figure 6:
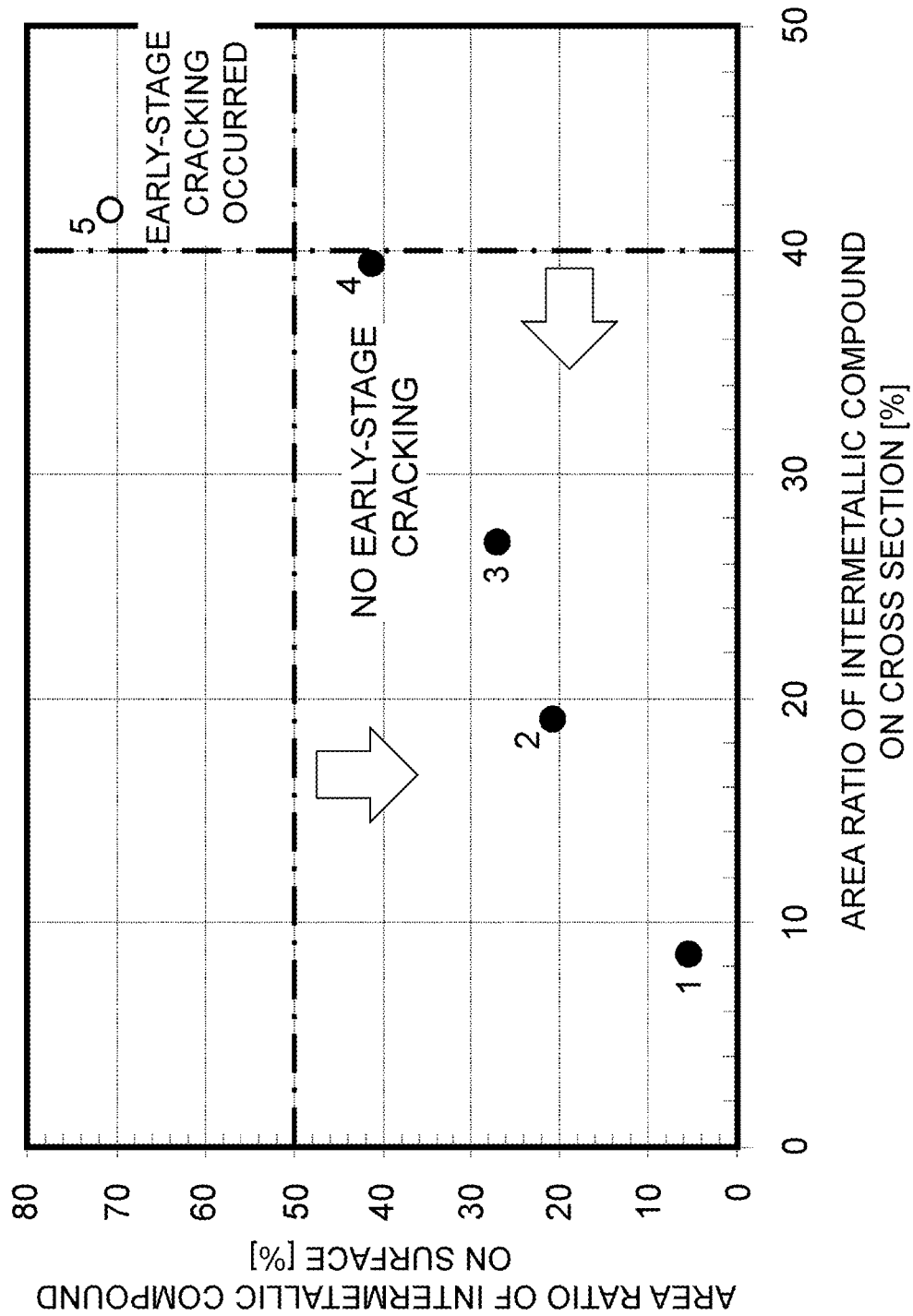
FIG. 6 is a graph showing a relation between area ratios of an intermetallic compound on a surface and on a cross section of a welded part and presence/absence of early-stage cracking in the welded part.
Figure 7:
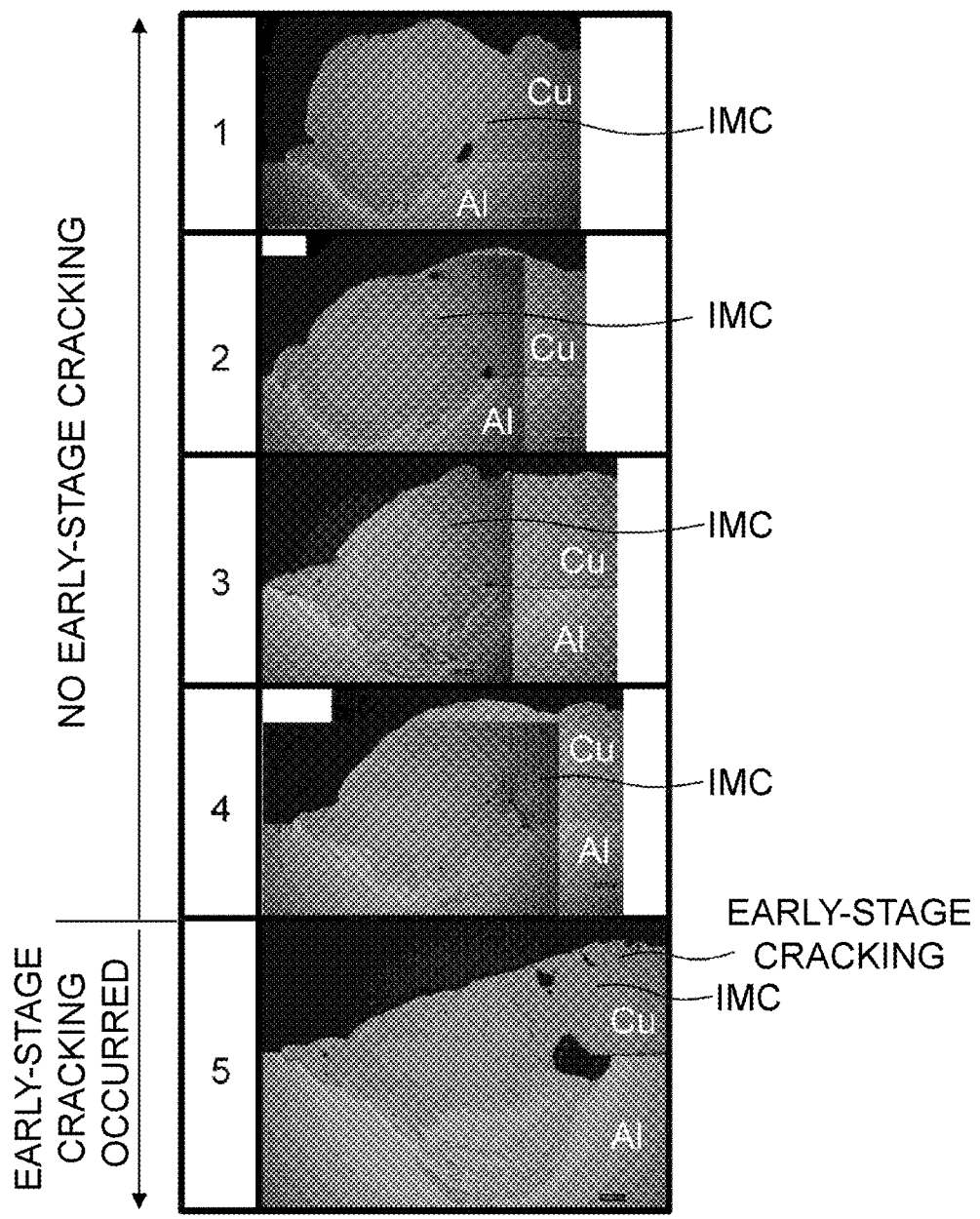
FIG. 7 shows photographs of microstructures on cross sections of welded parts in samples 1 to 5.

FIG. 6 is a graph showing a relation between area ratios of the intermetallic compound on the surface and on the cross section of the welded part and presence/absence of early-stage cracking in the welded part. A horizontal axis indicates area ratios [%] of the intermetallic compound on the cross section and a vertical axis indicates area ratios [%] of the intermetallic compound on the surface. In FIG. 6, the samples 1 to 4 according to the examples are indicated by black circles and the sample 5 according to the comparative example is indicated by a white circle. The sample numbers are added near the respective data points. FIG. 7 shows photographs of microstructures on the cross sections of the welded parts in the samples 1 to 5. Note that the photographs of the microstructures shown in FIG. 7 are actually color photographs, though they are shown in monochrome in the figures.

As shown in FIGS. 6 and 7, in each of the samples 1 to 4, the area ratio of the intermetallic compound on the cross section was 40% or smaller and no early-stage cracking occurred. In contrast to this, in the sample 5, the area ratio of the intermetallic compound on the cross section was 42%, i.e., larger than 40% and early-stage cracking occurred.

As shown in FIG. 7, in each of the samples 1 to 4, no sign of melting of the aluminum plate and stirring thereof is shown in the lower part of the welded part, thus indicating that the welding was thermal-conduction welding. Therefore, in each of the samples 1 to 4, copper (Cu) and aluminum (Al) in the molten pool were prevented from being stirred and the welded part generally exhibited a color close to copper or brass. Further, an amount of the intermetallic compound IMC that reached the outer surface of the welded part was small. Therefore, as shown in FIG. 6, the surface ratio of the intermetallic compound on the surface was 50% or smaller in all the samples.

On the other hand, as shown in FIG. 7, in the sample 5, there is a sign indicating melting of the aluminum plate and stirring thereof in the lower part of the welded part, thus indicating that the welding was key-hole welding. Therefore, in the sample 5, stirring of copper (Cu) and aluminum (Al) in the molten pool was accelerated and the welded part generally exhibited a color close to silver or gray. That is, the generation and growth of the intermetallic compound IMC were accelerated and the amount of the intermetallic compound IMC that reaches the outer surface of the welded part increased. Therefore, as shown in FIG. 6, the area ratio of the intermetallic compound on the surface drastically increased to 70%.

As described above, in the samples 1 to 4 according to the examples, the copper plate and the aluminum plate were welded together by making the molten pool of copper formed in the copper plate come into contact with the aluminum plate by the thermal-conduction welding. Therefore, copper and aluminum in the molten pool were prevented from being stirred, thus making it possible to prevent the intermetallic compound from being generated and growing in contrast to the sample 5 according to the comparative example in which the key-hole welding was performed. Therefore, it was possible to prevent early-stage cracking from occurring in the welded part due to the intermetallic compound.

Example 2

<Test Condition>

Next, conditions for tests for a method for stack-welding dissimilar metal members according to an Example 2 are described. Similarly to the Example 1, for each sample, a copper plate having a thickness of 0.5 mm (JIS standards C1100) was placed on an aluminum plate having a thickness of 1.5 mm (JIS standards A1050). Then, they were welded together by applying a laser beam from above the copper plate under conditions shown below. Note that a gap G like the one shown in FIGS. 2 to 5 was formed.

In the Example 2, the solidification time of the molten pool was changed and its influence on the early-stage cracking in the welded part was examined. Specifically, for each of three different levels of the irradiation energy, the solidification time of the molten pool was changed by changing the scanning speed (and the power output) of the laser beam to three different speeds (and the power levels). For each of these nine conditions, presence/absence of early-stage cracking in the welded part was examined twice. Note that the solidification time of the molten pool is a time from the end of the irradiation with the laser beam to the completion of the solidification of the molten pool. The solidification time of the molten pool was measured by using a high-speed camera having a frame rate of 12,000 frames/s. A beam diameter of the laser beam was 0.6 mm for all the samples.

Table 2 collectively shows the irradiation energy [J], the scanning speed [mm/s], and the power output [kW] of the laser beam LB in the method for stack-welding dissimilar metal members according to the nine conditions (Conditions 1-1 to 1-3, 2-1 to 2-3, and 3-1 to 3-3). As shown in Table 2, the irradiation energy was set to three different levels, i.e., to 24.0 J (Condition 1), 27.0 J (Condition 2), and 30.0 J (Condition 3). Further, with each of these three levels, the scanning speed was changed to three different speeds, i.e., to 60.0 mm/s (Sub-condition 1 for each condition), 79.8 mm/s (Sub-condition 2 for each condition), and 106.1 mm/s (Sub-condition 3 for each condition). The scanning distance of the laser beam was 0.8 mm for all the conditions. Further, the power output under each of the conditions was determined by using the above-shown Expression (1).

TABLE 2

|  | Irradiation energy [J] | Scanning speed [mm/s] | Power output [kW] |
| --- | --- | --- | --- |
| Condition 1-1 | 24.0 | 60.0 | 1.800 |
| Condition 1-2 | 24.0 | 79.8 | 2.394 |
| Condition 1-3 | 24.0 | 106.1 | 3.184 |
| Condition 2-1 | 27.0 | 60.0 | 2.025 |
| Condition 2-2 | 27.0 | 79.8 | 2.693 |
| Condition 2-3 | 27.0 | 106.1 | 3.582 |
| Condition 3-1 | 30.0 | 60.0 | 2.250 |
| Condition 3-2 | 30.0 | 79.8 | 2.993 |
| Condition 3-3 | 30.0 | 106.1 | 3.980 |

<Test Result>

Figure 8:
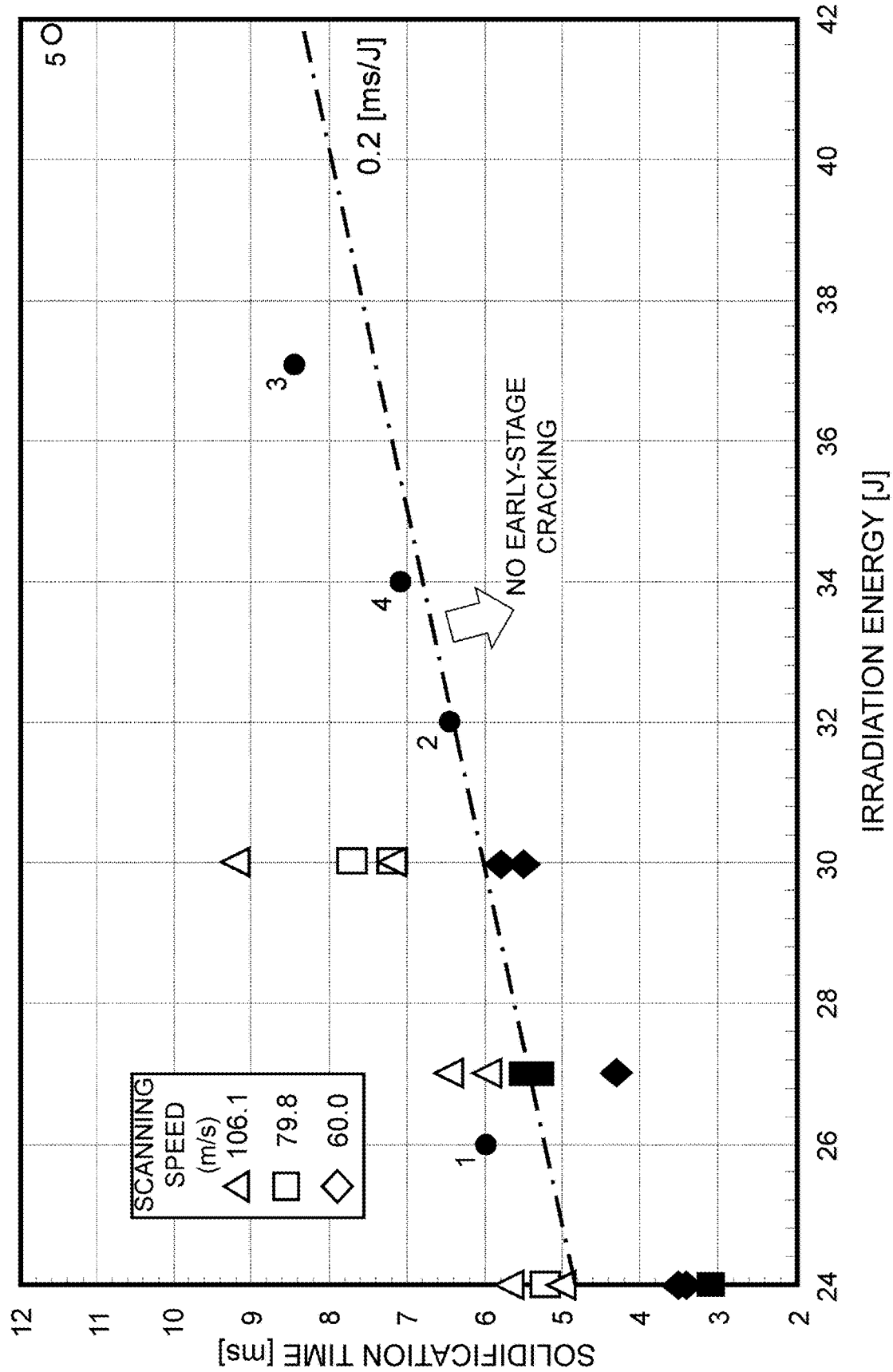
FIG. 8 is a graph showing a relation between irradiation energy and solidification time and presence/absence of early-stage cracking in a welded part.

FIG. 8 is a graph showing a relation between irradiation energy and solidification time and presence/absence of early-stage cracking in the welded part. A horizontal axis indicates irradiation energy [J] and a vertical axis indicates solidification time [ms] of the welded part. In FIG. 8, data points for the scanning speed of 60.0 mm/s are indicated by diamond-shaped marks and those for the scanning speed of 79.8 mm/s are indicated by square marks. Further, data points for the scanning speed of 106.1 mm/s are indicated by triangular marks. Further, data points for the examples in which no cracking occurred are indicated by black marks and those for the comparative example in which cracking occurred are indicated by outlined mark (i.e., while marks). Further, in FIG. 8, data of the samples 1 to 5 according to the Example 1 and its comparative example are also indicated by black circles and white circles. The sample numbers are added near the respective data points of the samples 1 to 5.

As shown in FIG. 8, it has been shown that at each of the three levels of the irradiation energy, i.e., at each of 24.0 J, 27.0 J and 30.0 J, no early-stage cracking occurred when the solidification time was short. Further, as the solidification time increased, early-stage cracking occurred. It is inferred that this is because the generation and growth of the intermetallic compound are accelerated as the solidification time increases. Note that as shown in FIG. 8, the higher the scanning speed was, the longer the solidification time became. It is inferred that this is because as the scanning speed increases, the irradiation time becomes shorter and hence the amount of heat extracted (or discharged) during the irradiation decreases.

Further, as shown in FIG. 8, it has also been found that as the irradiation energy increases, early-stage cracking becomes less likely to occur even when the solidification time increases. From the result shown in FIG. 8, it has been found that it is possible to effectively prevent early-stage cracking from occurring by applying a laser beam under a condition in which the solidification time for the irradiation energy of the laser beam is 0.2 [ms/J] or shorter.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for stack-welding dissimilar metal members by placing a first metal plate and a second metal plate having a melting point higher than that of the first metal plate on top of one another and performing laser welding, the method comprising:

placing the second metal plate having the higher melting point on the first metal plate, such that when the second metal plate is placed on the first metal plate prior to the irradiation with the laser beam, a gap is formed directly below an angled portion of the second member, between the first and second metal plates in a place where the laser beam is applied above it, and forming a molten pool in which only the second metal plate is melted, including the angled portion of the second metal plate, by applying a laser beam for thermal-conduction welding from above the second metal plate to the second metal plate only, wherein after the molten pool comes into contact with the first metal plate and the first metal plate melts in the molten pool only via heat conduction from the molten pool without the laser beam being further applied, and creating a combined molten pool, the combined molten pool solidifies, so that the first and second metal plates are welded together.

2. The method for stack-welding dissimilar metal members according to claim 1, wherein
    the first metal plate is made of a metallic material containing aluminum as a main component, and
    the second metal plate is made of a metallic material containing copper as a main component.

3. The method for stack-welding dissimilar metal members according to claim 2, wherein the laser beam is applied under a condition in which for irradiation energy [J] of the laser beam, a time [ms] from the end of the irradiation with the laser beam to the completion of the solidification of the molten pool is 0.2 [ms/J] or shorter.

* * * * *